Aug. 24, 1937.  W. F. MESINGER  2,091,051
BALANCED VALVE
Filed Dec. 30, 1932  2 Sheets-Sheet 1

INVENTOR
WILLIAM F. MESINGER
ATTORNEY

Patented Aug. 24, 1937

2,091,051

UNITED STATES PATENT OFFICE 2,091,051

BALANCED VALVE

William F. Mesinger, Flushing, N. Y., assignor, by mesne assignments, to Union Carbide and Carbon Corporation, a corporation of New York Application December 30, 1932, Serial No. 649,485

5 Claims. (Cl. 50—23)

This invention relates to the balancing of valves in control of the flow of fluid through a passage and more particularly to the use of such balanced valves in fluid pressure regulators for maintaining the discharge pressure of fluid passing through such regulators uniform.

In regulators of this character, there has heretofore been provided a casing with a passage therethrough divided into inlet and outlet portions in which the flow of fluid from the inlet to the outlet portion is under control of a valve operated automatically by pressure-responsive means, as a diaphragm, under influence of changes in pressure on the outlet side of the valve and suitably connected with the valve so as to vary its position with respect to its seat in accordance with the changes in fluid pressure in the outlet portion of the passage. In normal operation of the apparatus, such a construction gives quite satisfactory results but when variations occur in head pressure on the intake side of the valve above or below a normal range for which the apparatus is adapted, it seriously affects the regulatory operations of the valve under influence of discharge pressure so as to cause objectionably wide variations in the discharge pressure from that for which the pressure-responsive means is adjusted.

An important object of the invention, therefore, is to provide, in regulator apparatus of the above character having a valve operable under influence of pressure changes on the outlet side thereof for maintaining the discharge pressure of the apparatus uniform, improved means whereby the valve, in its regulatory movements, will be rendered unresponsive to pressure changes on the inlet side thereof.

In accordance with this invention, regulator apparatus of the above character embodying the principles of the invention may include a control valve under normal operation by means responsive to changes in pressure in the passage on the outlet side of the valve and a pressure responsive member in the passage on the inlet side of the valve which is operable under the influence of pressure changes and so constructed and so connected with the valve that the effect of changes in head pressure on the valve and on the pressure responsive member will counterbalance each other and nullify the influence of such head pressure upon the normal operation of the valve under control of pressure changes in the outlet portion of the passage; the pressure responsive member being preferably contractible and expansible under influence of pressure changes.

Figure 1:
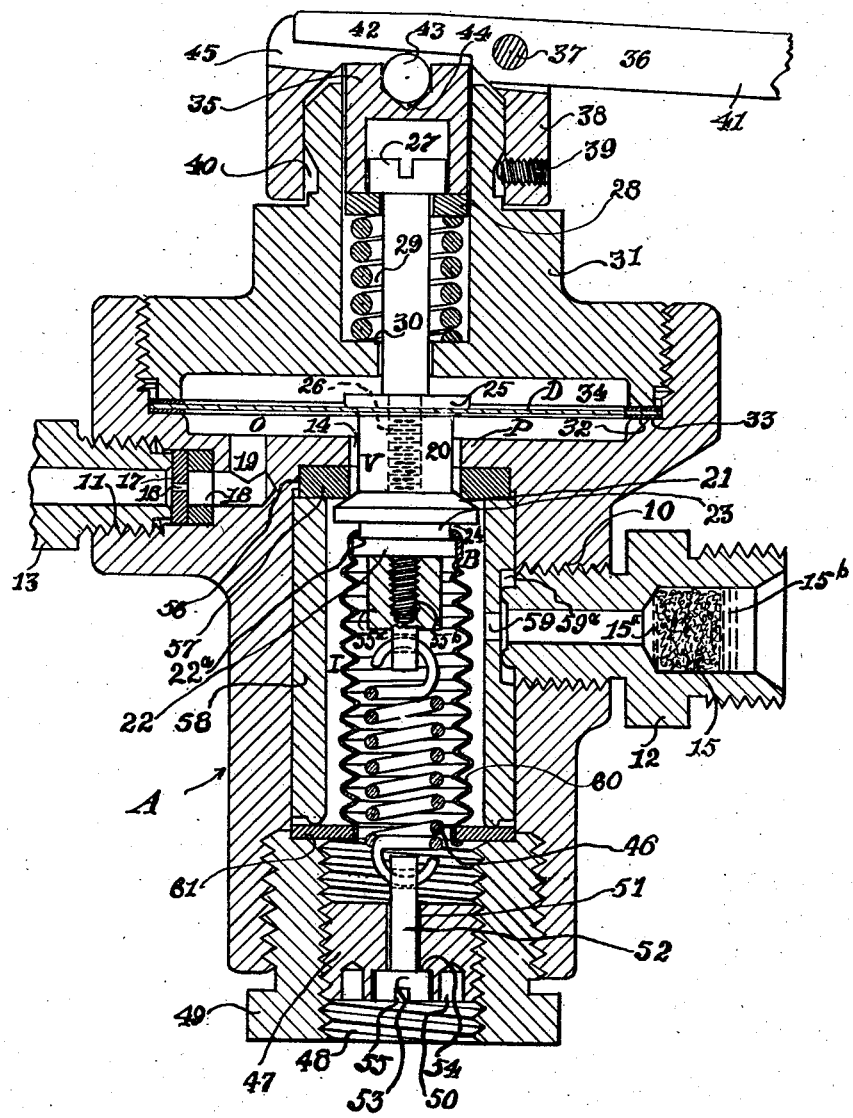
Figure 2:
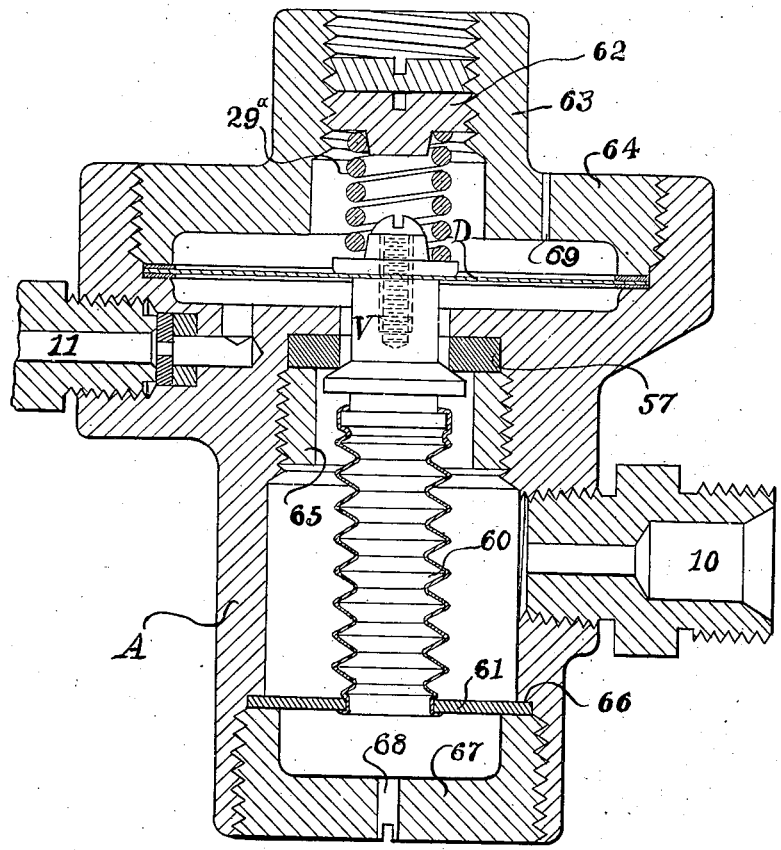

The above and other objects and the novel features of the invention will be made apparent from the following specifications taken in connection with the accompanying drawings, in which Fig. 1 is a sectional view of one embodiment of the invention; and Fig. 2 is a sectional view showing another form of the invention.

The form of the invention illustrated in Fig. 1 of the drawings is particularly adapted for use with primers for internal combustion engines although not limited to such use. In this form of the invention there is provided a casing A having a passage B therethrough divided by a partition P into inlet and outlet chambers I and O; the partition having a port 14 therethrough controlled by a valve V operable automatically under influence of pressure changes in the outlet chamber O as exerted on the valve through movements of pressure-responsive means, such as a diaphragm D secured in the outlet chamber. The casing A has an inlet port 10 opening into the inlet chamber I and an outlet port 11 through which the outlet chamber O discharges and to these ports are respectively connected conduits 12 and 13 leading from a source of fluid supply and to suitable distributing apparatus (not shown). The effect of head pressure on the normal operation of the valve at variance from that for which the apparatus is designed, is eliminated by providing in the passage on the inlet side of the valve suitable pressure responsive means 50 so connected between the valve and a fixed support and so constructed and arranged that the effect of force exerted by head pressure upon the valve will be counteracted and substantially eliminated.

The conduit 12 may be in the nature of a nipple having an axial bore and threaded into an aperture 10 formed in the wall of the inlet chamber I and the nipple may be counterbored to receive a suitable filtering packing 15 which is held between perforated metallic discs 15a and 15b. The outlet port 11 may be provided with a metering orifice 16 in an orifice disc 17 which is held against a washer 18 in the outlet passage 19 by the end of the conduit 13.

The valve V, in control of port 14, may be of any suitable form and as shown has a cylindrical body portion 20 and a frustoconical portion 21 at the lower end thereof beneath which is a head 22 spaced from the conical portion and connected thereto by a neck 23 thereby providing an annular channel or groove 24, between the head and the frustoconical portion. The valve is connected to the diaphragm D by means of the cylindrical portion 20 thereof and a disc 25 between which the diaphragm is clamped, and these elements are held together by a screw 26 screwed into the cylindrical body and having a shoulder resting on top of the disc. The screw shank is of considerable length and serves as a stem for the valve; the shank extending through an aperture disc 28 and having a head 27 resting thereon and supported thereby; the disk 28, in turn, resting upon a heavy spring 29 which rests on a shoulder 30 at the bottom of a bore formed in the cap or bonnet 31 of the casing.

This cap 31 serves as a removable closure for the outlet chamber O and is in threaded engagement with the body of the casing A; serving also to clamp the edges of the diaphragm D against a shoulder 32. Leakage around the diaphragm is prevented by provision of a suitable gasket 33 of paper or other suitable material between the edges of the diaphragm and shoulder 32 and a second gasket 34 may be placed on top of the diaphragm which may be of paper or a soft metal such as brass.

The valve V is normally held closed by the upward thrust of spring 29 against the disc 28 and may be freed to open and close under influence of pressure changes in the outlet chamber by compression of this spring. Suitable means whereby this may be accomplished is provided and comprises a cap 35 resting on the disc 28 and adapted to be pressed down in the bore 30 by means of a hand lever 36 which is pivoted at 37 to a ring 38; the ring being for purposes of assembly, removably secured to the cap 31 by set screws 39 extending into an annular groove 40 formed in the cap. The lever has a long arm 41 for operation thereof and a short arm 42 contacting intermediately of its ends on a ball bearing 43 carried in a recess 44 in the top of the cap 35. Movement of the lever is limited by extending the short arm across the bore 30 into the notch 45 formed in the ring 38 but should be adequate to insure sufficient compression of spring 29 to permit freedom of movement of the valve V under influence of changes in pressure in the outlet chamber.

When the spring 29 is so compressed, the valve will be held in suspension by the diaphragm D and its normal position relative to its port 14 will be determined by proper adjustment of suitable yieldable means as a tension spring 46 connected between the valve and an adjustable member, as a plug 47, threaded into a bore 48 at the lower end of the inlet chamber I; the bore being formed, in the present embodiment, in a removable, annular, closure plug 49 threaded into the lower end of chamber I. The plug 47 is provided in its end with sockets 50 to accommodate a turning tool and with a central bore 51 to accommodate the shank of a pin 52 forming a swivel connection between the plug 47 and spring 46. The pin has a head 53 at its lower end resting in a socket 54 at the lower end of bore 51 and the head is provided with a kerf 55 to accommodate a tool for holding the pin stationary when the plug 47 is being turned for making adjustments of the spring tension. The upper end of the spring 46 is hooked into an eye provided on the end of a nut 55a which is threaded onto a shank 55b projecting from the under side of the valve.

The inlet chamber I is preferably in the nature of a cylindrical bore and is provided at its upper end with a recess 56 for reception of an annular seat 57 for the valve; the seat being preferably of somewhat yielding material so as to make with the valve, a substantially leak-proof closure. The seat is held in place by a tubular sleeve 58 fitting snugly in the bore of the chamber provided with a side opening 59 surrounded by a recess 59a into which the end of the nipple 12 projects so as to form a leak-tight fit.

In order to counteract the effect of pressure fluctuations in the inlet chamber I at sufficiently wide variance from the normal for which the apparatus is adjusted to objectionably affect the normal regulatory movements of the valve, there is provided in the bore of chamber I a contractible sleeve 60 in the nature of an "accordion-like" bellows preferably made of resilient metal, as copper, and having circumferential pleats throughout its length. The sleeve is secured, at its upper end, in the annular groove 24 in the valve V to which it is hermetically sealed by a ring of solder 22a or otherwise, and the lower end of the sleeve is similarly secured to a supporting ring 61 held between the end of the sleeve 58 and the closure plug 49.

When fluid enters the inlet chamber, it acts on the rear face of the conical portion of the valve tending to close it and, when its pressure is sufficiently great, tends to seriously interfere with the proper operation of the valve for maintaining the fluid in chamber O at the pressure for which the apparatus has been adjusted. This tendency however is overcome in the present apparatus by providing a proper balance between the effective surface of the sleeve 60 and the effective area of the valve surface against which the pressure in the inlet chamber acts or would act if the contractile sleeve 60 were not provided. With such apparatus properly adjusted and balanced the valve will operate under outlet pressure only and will deliver fluid at the pressure for which the apparatus has been adjusted.

The apparatus as shown in Fig. 2 differs from that shown in Fig. 1 mainly in the omission of spring 46 and the functioning of the heavy spring above the diaphragm D.

In this form of the invention there is provided a casing A having inlet and outlet chambers separated by a partition with a port therein and having inlet and outlet ports leading respectively to the inlet and from the outlet chambers. The valve V is connected to the diaphragm D in the same manner as in Fig. 1 and there is connected to the lower end of the valve a resilient, circumferentially corrugated sleeve 60 acting in the same manner as that in Fig. 1. The tension spring 46 is omitted and positioning of the valve V relative to its port is effected by adjustment of yieldable pressure means as a spring 29a resting on top of the diaphragm D by means of the plugs 62 threaded into the bore of a tubular neck 63 which is formed as part of the closure cap 64 for the outlet chamber. The sleeve 58 of the apparatus shown in Fig. 1 is also omitted and the valve seat 57 is held in place by a ring screw 65. The supporting ring 61 is secured against a shoulder 66 at the lower end of the inlet chamber by the closure cap 67 which is centrally apertured at 68 to expose the interior of the sleeve 60 to atmospheric pressure. Cap 64 is also vented at 69 to expose the upper side of diaphragm D to atmospheric pressure. The yieldable pressure means 29a is preferably of such character that its force value will change relatively very little with the normal regulatory movement of the valve when the force on the valve due to inlet pressure is exactly balanced. When a coiled spring is used it is desirable that the effective areas should differ by an amount sufficient to cause a change in relative force therebetween sufficient to compensate for changes in force of the spring due to movement of the valve.

The operation of this form of apparatus is similar to that in Fig. 1 as a regulator but is not well adapted to the priming of internal combustion engines since the valve V is normally held open.

Also, when it is desired to more exactly balance out the variations in head pressure on the valve, the portion of the inlet chamber I on the opposite side of the partition formed by the bellows 60 and the supporting disc 61 from that in which the valve is located may be placed in communication with the outlet passage 11. By this arrangement the ratio of pressures acting on the inlet and outlet sides of the valve V are always equal to the ratio of pressures acting on the outside and inside of the bellows.

I claim:

1. Pressure regulating apparatus comprising the combination of a casing having a passage extending therethrough divided into inlet and outlet portions, means including a valve for controlling the flow of fluid through said passage from the inlet to the outlet portions thereof, means, including a spring acting to open said valve disposed in the inlet portion of said passage, responsive to changes in the pressure of the fluid in the outlet portion of said passage for regulating said valve, a resilient bellows enclosing said spring responsive to changes in pressure of the fluid in the inlet chamber having an effective area such as to provide a force counteracting the force exerted by such fluid upon the effective area of the valve as the fluid pressure varies, a second spring stronger than said first-mentioned spring and acting in opposition thereto on the valve for normally maintaining said valve in a closed position, and means for rendering said second-mentioned spring inoperative at will.

2. Pressure regulating apparatus comprising the combination of a casing having a passage extending therethrough divided into inlet and outlet portions; means including a valve for controlling the flow of fluid from the inlet to the outlet portions of said passage; means including an adjustable tension spring disposed in the inlet portion of said passage and means responsive to variations in the pressure of the fluid in the outlet portion of said passage for regulating said valve; a resilient bellows enclosing said spring responsive to changes in pressure of the fluid in the inlet chamber having an effective area such as to provide a force for counteracting the force exerted by such fluid upon the effective area of the valve as the fluid pressure varies; a second spring disposed adjacent the outlet portion of said passage and adapted to act in opposition to the first named spring upon said valve; means for rendering said second spring inoperative at will; and means for adjusting the tension of said first named spring without interfering with the normal setting of said second spring.

3. Apparatus comprising the combination of a casing having a fluid passage extending therethrough, means having a port therein for dividing said passage into inlet and outlet chambers, a valve for controlling the flow of fluid through said port from said inlet to said outlet chamber, means connected to and controlling said valve including pressure responsive means disposed in said outlet chamber responsive to changes in the pressure of fluid therein and a coil spring acting to open said valve with a force that diminishes as the valve opens, and a resilient contractile sleeve having an end connected to said valve and responsive to variations in the pressure of the fluid in said inlet chamber for opposing the effect of inlet pressure on said valve, said sleeve having an effective area exposed to inlet pressure smaller than the corresponding area of said valve by an amount sufficient to provide a variation in the relative force therebetween that compensates for the diminishing force of the spring as the valve opens.

4. Apparatus comprising the combination of a casing having a fluid passage extending therethrough, means having a port therein for dividing said passage into inlet and outlet chambers, a valve for controlling the flow of fluid through said port from said inlet to said outlet chamber, means connected to and controlling said valve including pressure responsive means disposed in said outlet chamber responsive to changes in the pressure of fluid therein and a coil spring acting to open said valve with a force that diminishes as the valve opens, and a resilient contractile sleeve having an end connected to said valve and responsive to variations in the pressure of the fluid in said inlet chamber for opposing the effect of inlet pressure on said valve, said sleeve having an effective area exposed to inlet pressure substantially equal to the corresponding area of said valve and providing a resilient effect opposing the effect of force changes as the valve opens.

5. Pressure regulating apparatus comprising the combination of a casing having a passage extending therethrough divided into inlet and outlet portions, means including a valve for controlling the flow of fluid from the inlet to the outlet portions of said passage, means including a valve control spring disposed in the inlet portion of said passage and means responsive to variations in the pressure of the fluid in the outlet portion of said passage for regulating said valve, and a resilient contractile sleeve arranged coaxially with said valve and having the ends thereof connected to said valve and to said casing, such sleeve being disposed coaxially about said valve control spring and having an effective area responsive to variations in the pressure of the fluid in the inlet portion of said passage substantially equal to the effective area of said valve on which fluid pressure acts for counteracting the force exerted upon the inlet side of said valve when the pressure of the fluid varies and cooperating with said spring for reducing the effect of force changes as the valve opens.

WILLIAM F. MESINGER.